March 26, 1968     A. E. FLANDERS ETAL     3,374,530
PROCESS FOR THE JOINDER OF METALLIC MEMBERS
Filed July 16, 1965     2 Sheets—Sheet 1
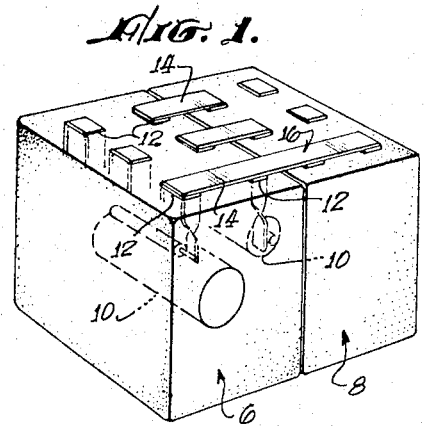
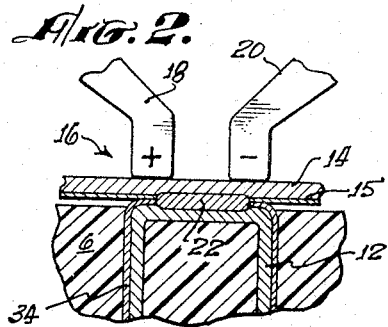
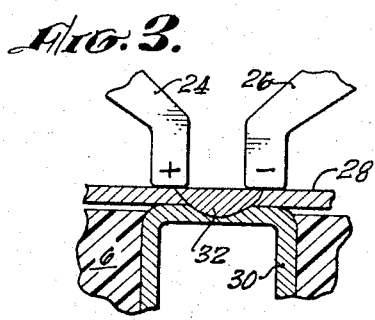
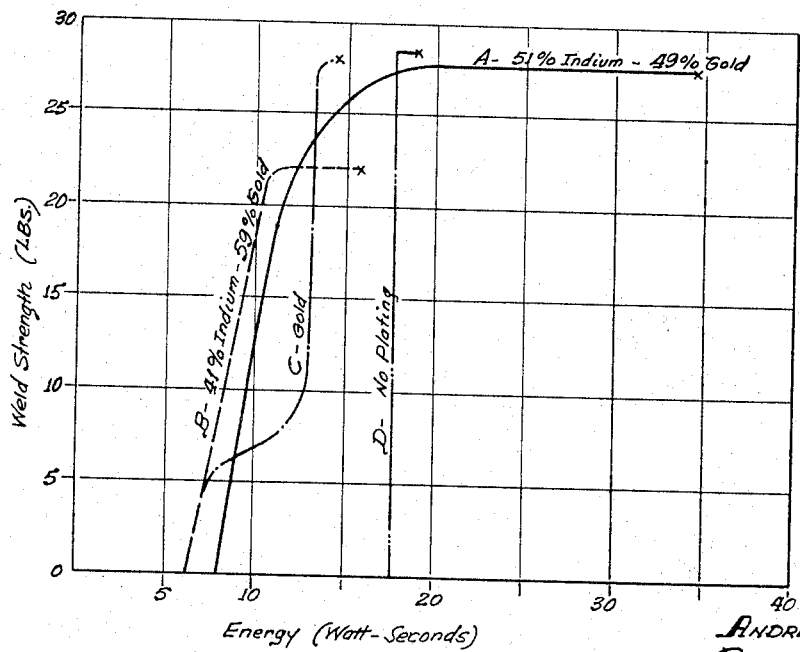
ANDREW E. FLANDERS,
CLAUDE E. FLEIGHNER,
INVENTORS

INVENTORS.
ANDREW E. FLANDERS,
CLAUDE E. HEIGHNER,
ATTORNEY.

United States Patent Office 3,374,530
Patented Mar. 26, 1968

3,374,530
PROCESS FOR THE JOINDER OF
METALLIC MEMBERS
Andrew E. Flanders, Pomona, and Claude E. Feighner, Ontario, Calif., assignors to General Dynamics Corporation (Pomona Division), Pomona, Calif., a corporation of Delaware
Continuation-in-part of application Ser. No. 294,644, July 12, 1963. This application July 16, 1965, Ser. No. 477,075
19 Claims. (Cl. 29—484)

ABSTRACT OF THE DISCLOSURE

This disclosure relates to transmission or conductive material suitable for welding applications, particularly surface welding applications, and to a solution from which the transmission material is coated. The conductive or transmission material in the as-plated condition is constructed of a base metal with a layer or coating of at least indium and gold. The base metal may be, for example, nickel, copper, silver, chromium, or nickel-iron alloy such as Kovar, each having atomic radii compatible with welding techniques. A surface welding technique in conjunction with the coating effects an interface bond between joined members. At least one of the two members to be welded is coated and the members are positioned face to face with the coated surface or surfaces in abutment. The two electrodes of the welding machine are positioned on one side and in contact with the exposed surface of one of the positioned members to be welded with a predetermined pressure applied thereto. Energy is then rapidly applied in predetermined quantity through the electrodes, as a result of which heat is rapidly applied to an area localized to the material disposed intermediate the members being joined. The metal of the material being interconnected is thereupon caused to diffuse, fuse and coact, creating a bond between the members which is strong in the shear direction but which may be broken by peeling, and may be rewelded a number of times without degradation of the rewelded joint.

---

This application is a continuation-in-part of U.S. application Ser. No. 294,644, filed July 12, 1963, and assigned to the same assignee, now abandoned.

This invention relates to a method for accomplishing joinder of metallic members, particularly to a method for accomplishing surface welding of such members which has particular utility in electronic transmission lines or material employed in the interconnection of components in respective electrical modules or subassemblies, and more particularly to a joinder of metallic members which provides serviceability of the joint.

Heretofore, interconnection of module components has been accomplished by such means as electronic harnesses, coaxial connectors, special cables, mechanical connectors and various transition arrangements. These means of interconnection, however, require the use of soldering and hence are subject to its well known shortcomings of cold-flow, lack of reliability, and relatively low resistance to adverse environmental conditions, such as vibration and shock.

In U.S. Patent No. 3,150,288 there is described in detail a unique transmission line which affords an improved means for joining together the components of one electrical module with the components of another such module. Although not limited to that particular transmission line or to transmission lines in general, this invention has particular utility in accomplishing its joinder and accordingly such transmission line or material will be herein referred to as exemplary of an important use for the method of this invention.

Briefly, the electronic transmission material made in accordance with this invention comprises a sheet, strip, or ribbon coated on at least one side (excluding the complementary face not being joined) with fusible material for interconnecting component leads, etc., of an electronic module, header board, or printed circuit board, or for other such applications. The material to which the electronic transmission material is connected may or may not be coated with the fusible material. Only one or the other of the members need be coated in the area of the joinder interface. Also a number of different metals may be used as the base metal of the sheet, strip, or ribbon, or may be joined by the fusible coating of the transmission material. A joint made in accordance with this invention provides a simple yet effective mechanical and electrical connection which can be removed and reconnected many times without degradation of the quality of the mechanical or electrical interconnection.

As illustrated in the drawings, as an example only, the electronic transmission line or material makes use of connector members formed from integral metal strips. Each connector member is provided with a contact section extending along the surface of a module or of a header board forming a part of a module. A tab section of the connector member extends from an end of the contact section into the module for electrical contact with a lead wire of at least one component.

Welding is employed in making the joinder of electronic transmission material to a component lead or the like. Therefore, the problems associated with soldering heretofore encountered in using other methods for interconnecting are substantially eliminated. Interconnections requiring serviceability can be made where only one side of the transmission material is exposed and available to the welding electrodes by surface welding techniques, as described hereinafter, and in which conventional welding techniques cannot be employed.

Briefly, the surface welding technique in conjunction with the unique coating, effects an interface bond between joined members. As pointed out above, at least one of the two members to be welded is coated as described hereinafter and the members are positioned face to face with the coated surface or surfaces in abutment. The two electrodes of the welding machine are positioned on one side and in contact with the exposed surface of one of the positioned members to be welded with a predetermined pressure applied thereto. Energy is then rapidly applied in predetermined quantity through the electrodes, as a result of which heat is rapidly applied to an area localized to the material disposed intermediate the members being joined. The metal of the material being interconnected is thereupon caused to diffuse, fuse and coact, creating a bond between the members which is strong in the shear direction but which may be broken by peeling and rewelded a number of times without degradation of the rewelded joint.

The fusible coating can be applied to the surface of a printed circuit and/or other members, such as a component lead surface welded to the printed circuit; or the coating can be applied to a ribbon, strip or sheet of suitable base metal and welded to another member.

Accordingly, it is an object of this invention to provide a method for welding together members which results in a strong, reliable welded joint.

A further object of the invention is to provide a welded joint which may be broken and rewelded a number of times with little or no adverse effect upon the subsequent weld.

Another object of the invention is to provide a method of welding members of electronic transmission material productive of a joint which will provide minimum interference with the transmission capabilities of the joined conductor members and which joint is fully capable of handling a broad spectrum of frequencies from DC to microwave.

Another object is to provide a method for welding ribbon members of an electronic transmission line which may be accomplished simply and reliably on a production and servicing basis with available welding equipment.

Another object is to provide a method of joinder for ribbon or sheet members which may be accomplished where but one side of a member to be joined is available for welding electrode contact.

Another object is to provide a method for joining together members coated from a solution consisting of indium and gold in a predetermined range of percentages by weight.

Another object is to provide a welded joint providing low resistance to radio frequencies by providing an interface bond and thereby the substantial elimination of noise from such causes as oxide surfaces and mechanical motion between the joint members.

Other objects and advantages of the invention will become readily apparent from the following description and accompanying drawings in which:

FIG. 1 is a perspective view of two encapsulated modules, electrical components of which are joined together through electronic transmission lines;

FIG. 2 is a view in cross-section of a typical welding setup with the electrodes appropriately positioned for carrying out the invention;

FIG. 3 is a view in cross-section similar to that of FIG. 2, but illustrating a typical series welding operation;

Figure 5:
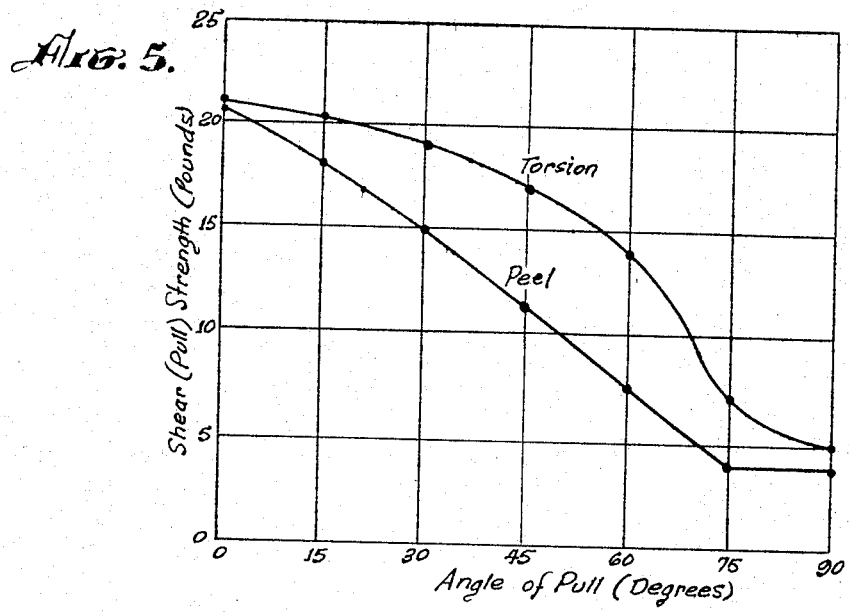
Figure 6:
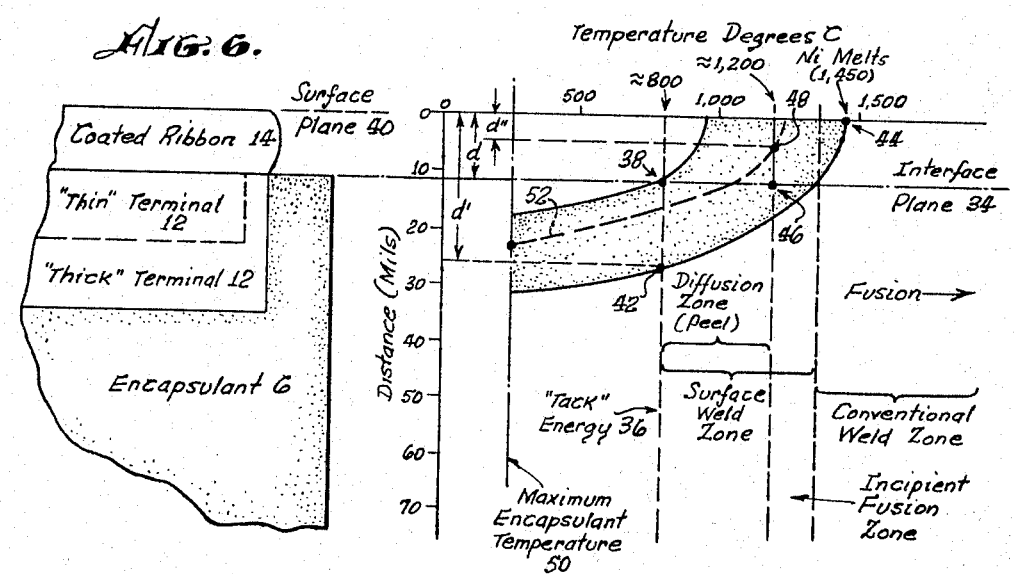

FIG. 4 graphically presents the results of tests conducted employing this invention;

FIG. 5 graphically presents the strength of welds made in accordance with the invention at various angles of torsion and peel; and FIG. 6 illustrates the surface weld diffusion temperature and gradient.

As briefly set forth above, the invention is directed to a transmission or conductive material suitable for welding applications, particularly surface welding applications, and to a solution from which the transmission material is coated. The conductive or transmission material in the as-plated condition is constructed of a base metal with a layer or coating of at least indium and gold. The base metal may be nickel, copper, silver, chromium, or nickel-iron alloy such as Kovar, each having atomic radii compatible with welding techniques.

While, as pointed out above, various metals may be utilized as the base metal, the description of the invention will be directed primarily to nickel as the base metal, for illustrative purposes only, and in no way should such description be considered as limiting the invention to this specific base metal.

Turning now to FIG. 1, there is shown an embodiment of the electronic transmission line or material employed in conjunction with encapsulated modules 6 and 8 to interconnect their respective electrical components 10, shown in phantom outline. Connected to each of the components 10 are integral metal strip members 12, of nickel for example, which project only slightly beyond the upper face of the modules to provide a terminal virtually flush with the module surface. Strip members 14, constructed in accordance with the invention, extend between the terminals 12 to provide interconnection between their respective associated electrical components, with surface welding being accomplished at positions 16 of member face abutment, as presently described in detail. For purposes of clarity in describing this invention, the foregoing description and the FIG. 1 showing have been deliberately simplified. However, as previously indicated, the method of this invention is not limited to the particular transmission line or material illustrated, though having particular utility in conjunction therewith.

In FIG. 2 there is shown an arrangement for accomplishing welding of a strip member 14 to a terminal member 12 employing the method of this invention. It will be noted that the members 12 and 14 are each provided with a coating designated by numeral 15 which is employed with salutary effect in the method of this invention. Although both members are shown to be so coated, the coating of one or the other will generally suffice. Members 12 and 14 are juxtapositioned with their coated surfaces in abutment, i.e., at the location of the element-to-element bond to be accomplished by welding. A pair of welding electrodes 18 and 20 of rectangular cross-section are shown in FIG. 2 positioned upon the exposed surface of member 14 at position 16 immediately above underlying coated terminal member 12. It will be noted that because of the underlying terminal member support afforded by the module, the exposed upper surface of member 14 is the only member surface available to the welding electrodes. With rapid application of welding energy and with appropriate electrode pressure, as discussed hereinafter, a surface weld is effected with the fusing of the coatings and formation by strip coaction of a mutually formed alloy zone 22 and an interface bond. This bond is as strong or stronger than the base material of members 12 and 14.

In the as-welded condition, the interface bond of the transmission material, when utilized with nickel for example, is comprised primarily of nickel, gold, and indium. This ternary alloy may be considered to be predominantly composed of gold and nickel with the addition of indium to serve as a solid-state wetting or diffusant agent in addition to a hardening and an embrittling agent. When the transmission line or material utilizing nickel, for example, as the base metal, is welded to copper, for example, an interface quarternary alloy is created, which again exhibits properties of shear or torsion which are stronger than the base material and will therefore usually pull off the base copper metal member when removed.

It is important to note that there is here accomplished a surface weld, in contrast with a conventional series weld. In the latter type of weld, illustrated in FIG. 3, a resistance welding technique is employed wherein the current flows intermediate a pair of electrodes 24 and 26 through the abuttingly positioned members 28 and 30 to form a nugget 32. Energy is applied for a substantial period of time and the nugget formed extends the entire depth of upper member 28 and a substantial distance into the lower member 30. It is this nugget or fused portion, common to both members, which secures the joint. However, because of this sizable nugget, breaking of the welded joint cannot be accomplished without substantial damage or distortion to the joined members and obviously prevents rejoinder of either of the members at the same location.

In contrast with the conventional series welding techniques of FIG. 3, the method of this invention is one of surface welding, depending upon the application of a metal alloy coating to one or both of the adjoining faces of the two members to be joined, the alloy coating consisting essentially of at least indium and gold. Such a coating may be applied, as by use of the Dalic electro-brush process or a tank type plating process which provides for close control of the plating thickness by a monitoring of the plating current, the coating being formed from a solution containing at least a predetermined percentage by weight of indium and gold.

While the welding process and end result is described in greater detail with respect to FIGS. 4 to 6, the surface weld is accomplished by imparting heat in predetermined controlled quantity through the welding electrodes 18 and 20 to the interface of the strip members 12 and 14, i.e., in the area of the coating. Localizing of the heat at the interface is accomplished by rapid application of the electrode-imparted energy for a period of from approximately 2.5 to 10 milliseconds, depending on the characteristics of the welding equipment being used. Rapid application of heat assures the diffusion and fusion of the coating or coatings 15 and formation of an interface bond, but without fusion or diffusion of a large portion of the base metal of the members 12 and 14, as would be the case in conventional series welding applications. There is, however, a certain amount of the base metal which would be expected to enter into the bond and observations and tests have shown this to be the case. As indicated, the quantity of heat applied to the interface is important. This, of course, is controlled by the watt-second energy applied through the electrodes. Too little energy will result in, at most, an incomplete weld or a braze. Too much will produce burnout, i.e., a boiling out of the base material creating a void between the electrodes and/or no weld at all.

FIG. 4 illustrates the extreme importance of the alloy coating employed in this invention and its relation to weld energy and weld strength. Shown in FIG. 4 is a weld strength profile wherein the energy employed in welding a joint is plotted as the abscissa and the weld strength is plotted as the ordinate. Graphically illustrating operating parameters and tolerances, the curves show the results of a number of tests conducted with various plating materials. These curves indicate the superiority of the coating preferred for use herein which is plated from a solution which contains in percentage by weight of about 51 percent indium and about 49 percent gold relative one to the other. The plateau regions or flat portions to the right of the knee of such curves show regions of weld energy tolerance suited to welding operations. An energy tolerance in the order of ±20% is acceptable. However, it will be noted that there is a great difference in the breadth and ordinate positions of the plateaus and hence in practical welding suitability.

In the case of gold as the coating with its stepped curve C, the operating region depends upon the particular weld strength desired. Most preferable, of course, is the higher weld strength. However, as is apparent from the FIG. 4 curves, a burnout problem is presented when an attempt is made to achieve optimum strength in the case of nickel ribbon coated solely with gold. Inspection of curve C shows an extremely narrow upper plateau in the higher weld strength region. This indicates that the amount of welding energy employed must be precisely controlled when using short energy pulse durations and that any small variations, as would normally be expected in production, will result either in an extreme drop in weld strength (shown by the steep portion of the curves) or in burnout at the point defining the right hand extremity of the curve upper plateau region. It will be noted that the stepped curve C representing the gold coating presents the option of operating over a somewhat broader but lower plateau or tolerance region, but at the sacrifice of some 75 percent in weld strength, a highly undesirable solution of the weld energy problem.

An inspection of curve D, wherein no plating or coating is employed on a nickel ribbon, discloses an extremely narrow plateau, unsuited to welding. Also, considerably greater weld energy is required to initiate the weld profile than with welds of ribbons utilizing a coated surface. Curve B on the other hand, shows considerable improvement as the result of using a coated nickel ribbon wherein the coating is plated on the base metal from a solution which contains in percentage by weight of about 41 percent indium and about 59 percent gold relative one to the other. Obviously, the welding energy limits thereby afforded are suitable for production. However, curve A clearly illustrates the marked superiority of a coating from a solution which contains in relative precentage by weight 51 percent indium and 49 percent gold which is preferred herein.

Gold-indium plating solutions containing gold in greater relative percentages by weight than the 59 percent of the solution illustrated by curve B were tested but proved unsatisfactory, producing a similar compound or stepped type of curves characteristic of gold (curve C). On the other hand, gold-indium plating solutions having lesser relative percentages by weight of gold than the 49 percent of the preferred solution indicated by curve A were tested and found to yield alloys when welded of excessive brittleness.

In FIG. 4 it will be noted that curve A levels off at approximately 27½ pounds weld strength and 18 watt-seconds of weld energy to extend to a point of burnout at approximately 34 watt-seconds of energy. This means that by use of ribbon plated from a solution containing 51 percent indium and 49 percent gold, relative one to the other, there are provided practicable weld energy operating limits within which welding machines may be operated with assurance that reliable welds as strong as the base material will be consistently obtainable. Notwithstanding such strength, however, the weld is subject to separation without heating by using proper techniques. As discussed in detail hereinbelow, a twist or roll peeling will serve to separate the joined members without damage or serious distortion to either of them. The separated members may then be rejoined, separated and rejoined again without adverse effect to the terminal, obviously desirable where module removal is an important consideration, as in most electronic system installations. While the ribbon can be rewelded at the same point thereof, it is preferred to reweld the ribbon at a different location, thus insuring the electrical and mechanical characteristics of the weld.

Since diffusion is dependent on time as well as temperature, the pulse time affects the weld profile. A very short pulse does not provide adequate time for good that penetration prior to melting the top surface and is too brief to permit good mutual diffusion. The pulse time or pulse dwell should be adequate to permit mutual diffusion and the change of state from initial plasticity to final "freezing" of the materials being welded. Thus, different welders and/or different materials and thermal masses being welded will require different pulse times. The state of welder art has been greatly advanced in recent years thus providing a capability of producing a pulse time or dwell at the present time which is considerably longer than that available in welders at the time the parent U.S. application No. 294,644 was filed.

Surface welds tolerate a wide range in electrode pressure. Good welds are obtained above a certain minimum pressure; the maximum pressure, which may be approximately twice the minimum value, is usually limited by other considerations. The electrode pressure varies with the types of welders used and the materials being welded.

The electrode spacing is another parameter of surface welding, although it is not critical. A good rule of thumb is to select a convenient spacing approximately twice the thickness of the material upon which the electrodes are positioned. At least a two-to-one range in selected electrode spacing is usually tolerable. However, from an energy variation standpoint it is recommended that the selected spacing be maintained to within ±20% when not using dynamically controlled power supplies.

It is thus seen that surface welding depends upon a dissimilar metal plating or coating applied to one or both of the adjoining faces of the two pieces of material being joined. Heat with pressure is applied so that the plated metal diffuses and/or incipiently fuses to create a strong bond. Incipient fusion is herein defined as the state of a material in the region of maximum solidus temperature immediately below the liquidus state. Usually a small amount of the parent ribbon material (member 14) enters into the bonded region by alloying with the plating or coating material. The mutually diffused material is normally confined to the thin interface layer or bond 22 whose physical strength exceeds that of the plating and often that of the parent material. A unique characteristic of a surface weld made in accordance with this invention is that while the bond is often as strong or stronger than the base metal, the weld may be separated by the proper peel technique without damaging or distorting terminal 12, for example. This permits another ribbon conductor (member 14) to be rewelded many times to a given terminal. In addition, the material immediately under and between electrodes 18 and 20 is usually only sufficiently elevated in temperature so as to approach its melting temperature. Thus, stress at the usual nugget interface is avoided and the original grain structure and material strength properties are not detrimentally disturbed.

Certain metallurgical aspects of a surface weld are helpful in understanding the physical and electrical properties of this type of weld. The nature of current penetration has been shown by micro-sections of the weld in the region immediately below the inner heel of one of the electrodes at very near maximum permissible weld energy, which heat affected zone indicates the nature of the current pulse wave as it enters the material and generates heat. The high positive resistivity temperature coefficient of nickel provides this highly desirable property, which causes virtually instantaneous heat availability at the joining interface to elevate the materials to the proper diffusion temperature. This phenomenon does not make the weld dependent upon the relatively sluggish thermal flow that emanates from the top highly heated surface.

When viewing sectional microphotographs of surface welds utilizing the coated transmission material the following conditions are noted. Near the heels of the electrodes undisturbed grain structure of the parent material can be seen. In the vicinity of the outermost regions of the jointed interface there are light appearing lines that are the alloy plating material in its substantially original material state. In the center of the interface region is a dark appearing line; this is the mutually diffused region where the surface weld occurs. In between the surface weld and the outer plated regions are feathered transitional zones. These thinned zones not only provide appreciably diffused states with sound metallurgical properties, but a phenomenon known as "thin-film adhesion" is believed to exist, particularly in the outer thin regions and in the immediate nearby vicinity of the original plating. The theory is that two metal surfaces placed in intimate contact, separated by a film sufficiently thin, have the same molecular adhesion as in one discrete piece of metal. Electrons are expected to flow somewhat as readily in these outer regions as in the parent material.

Upon further magnification of the actual surface weld area described directly above, the dark appearing line has an appearance similar to the "bead" obtained in oxyacetylene welding. The bead-like structure is thought to be a highly ordered metallic crystal structure similar to a perfectly grown monolithic dendrite. Diffusion formations may be seen by virtue of the striations on either side of the surface weld "bead." The bead is formed in the interface region at temperatures in the upper vicinity of the diffusion zone and in the lowermost portion of the incipient fusion zone (see FIG. 6). This highly ordered crystal lattice offers an explanation for the very high strength exhibited by the surface weld of the electronic transmission material of this invention. However, sound surface welds may also be formed without developing the bead-like structure. These welds are formed under relatively cool interface temperatures and are perfectly satisfactory. Excellent bonds are developed in the vicinity well below incipient fusion but sufficient molecular mobility does not exist to permit growth of the highly ordered crystalline structure described above.

The severability feature of a properly controlled surface weld is highly desirable for many applications from a servicing viewpoint. The weld may be separated easily in a peeling manner much like a can is opened with a key. The ribbon or material is cut near the weld and the small end beyond the weld is pried up slightly. The lifted end is grasped between the tips of an appropriate tool, similar to long nosed pliers, with a firm grip and the tool rolled upon one of its radii in the direction toward the weld. Depending upon the convenience of approach, the tool which incorporates radii on its sides as well as its tip end may be placed on its side and rolled with a twist of the wrist, or the tool may be placed on its side and rolled over. This technique provides a nearly neutral force axis near the interface if a slight downward pressure is applied during the rolling motion. This virtually eliminates the extracting force that otherwise might be placed upon the terminal.

As pointed out above, many rewelds to a given terminal may be accomplished with no loss in strength with successive welds. Since a slight buildup of the alloy develops after each peel, it is sometimes desirable that the excess material be removed by a few deft strokes of a smoothing file after a number of rewelds have been made on the same terminal.

Since the surface weld strength is not as strong in peel as in shear, the characteristics of the weld strength at various angles of torsion (shear) and peel are illustrated in FIG. 5. Note that torsional angular stress is somewhat trigonometric in decreasing strength and that peel strength decreases linearly. This data serves as a guide to the proper application of stress where true shear loading cannot be accommodated. It is noteworthy that large angles of departure from the shear plane are required before a serious loss in strength is realized. Also, note that the peel strength drops to a point and then levels out without further reduction.

Tests have been conducted to determine the proper weld energy range for making welds utilizing the coated base metal and to verify the welding characteristics; namely, tack point, shear or pull strength, and peel strength. By establishing data it can be determined which weld energy setting for the specific welding equipment being utilized produces the desired shear strength of the type of material being utilized to produce the repairable weld. Practically every different combination of indium and gold by weight utilized in making the coating or plating requires a slightly different weld energy setting and produces different shear and peel characteristics. In addition, different batches of the base metal will produce slight weld energy differences. Also, it should be noted that energy settings may vary due to the variations in the power supply and the internal and external conditions of the welding equipment. Different types of welders have different internal characteristics and thus produce variations in the weld energy settings.

The following definitions are set forth for a more complete understanding of FIGS. 4–6:

(1) *Tack point.*—Weld energy at which bonding is about or beginning to occur at the weld profile slope intercept with the abscissa axis, which, as illustrated in FIG. 4, is of weld energy between 5 to 10 watt seconds for a particular weld equipment set up utilizing plated material.

(2) *Shear (pull) strength.*—The number of pounds stress (pull) required to shear or break the material under test. For example, with a power supply at 1.5 times the average tack point energy of FIG. 4, the welds should preferably test to destruction at a shear strength of 10 lbs. or above, or with a power supply at 11 watt seconds, the average weld should test to destruction at a shear strength of 14 lbs. or above.

(3) *Peel strength.*—The number of pounds stress (pull) required to peel the transmission material or line (member 14) from the element to which it was welded (terminal 12). For example, with the power supply set at 11 watt seconds on a particular machine, each weld should preferably peel when utilizing the proper technique at between 2.5 to 6 lbs. (see FIG. 5); although satisfactory welds have been produced with values above the preferred range, lower strengths are extremely rare. Generally, it has been determined that the higher percentages of indium in the coating or plating 15 tend to indicate a reduction in peel strength to a certain point.

(4) *No peel point.*—The minimum energy or related temperature point at which no peel occurs; i.e., which substantially forms a nugget-like structure as in conventional welding. However, as the pulse length capability of welders is lengthened, it has been found that non-peelable welds can be more readily obtained with certain relatively thick material that would not produce a non-peelable weld at a shorter pulse duration.

As seen from the weld profiles, surface welds with good properties may be obtained even though the energy range is varied appreciably. However, there are certain physical restraints that must be observed to assure proper surface weld characteristics. The important physical dimension of the ribbon 14 and the terminal 12 are related to the surface weld temperature zone as illustrated in FIG. 6.

As clearly shown in FIG. 6, there is an upper thickness limit to the ribbon or material 14 for obtaining proper interface temperatures at reasonable pulse durations. With a ribbon of the thickness (*d*) the "interface plane" 34 and "tack energy" 36 intercept point is indicated at 38. If the distance of interface plane 34 from the "surface plane" 40 of ribbon 14 is considerably increased to the thickness (*d'*), e.g., approximately doubled, a temperature gradient curve through the new tack energy point 42 intersects the surface plane 40 at a temperature very near the melting point of nickel as indicated at 44. Thus ribbon of thickness (*d'*) leaves very little latitude in weld energy as it relates to the permissible surface weld temperature having good bondability.

On the other hand, if the interface distance (ribbon thickness) is decreased to very small values as indicated at (*d''*), i.e. less than 5 mls., interface temperatures above (to the right of) the upper diffusion zone boundary line 46 as indicated at 48 represent a significant portion of the weld range in which peel conditions may not exist. Note that the shaded area to the right of point 48 (the questionable or no peel area) is substantially equal to the shaded area to the left of point 48 thereby limiting the weld energy range. The peel or repairable characteristic of this invention does not occur at fusion interface temperatures and is highly unlikely at incipient fusion interface temperatures.

In the event of "thin" terminal members 12 another restriction is placed on the weld energy, this being the maximum stress temperature 50 for the encapsulant or bonding material of module 6. The dotted line indicated at 52 illustrates the maximum energy temperature gradient curve for proper operation with "thin" terminal surface welding applications. Note that peelability is always assured with a "thin" terminal by virtue of the encapsulant temperature limit as indicated by the intersection of 50 and 52.

The curves of FIG. 6 provide a method or model to establish the parameters for a given application, namely, nickel. In establishing such a model for new applications, the following four boundary conditions should be considered:

(1) Initial diffusion temperature "tack" weld energy, 38.

(2) Upper surface melting temperature weld energy, 44.

(3) Maximum encapsultant temperature, intersection of 50 and 52.

(4) Peel weld energy limit (if any), 46.

It is thus apparent from FIG. 6 that a weld schedule for a specific welder and a specific ribbon or material thickness can be established for the required temperature along interface plane 34 for initial diffusion temperature (tack point) weld energy and the peel weld energy limit. This is accomplished by the determination of how much heat (weld energy) must be applied on the surface plane 40 to provide the required "tack" and maximum "peel" temperatures on plane 34 for that specific ribbon thickness.

From the above it is apparent that terminals 12 must be proportioned properly and designed to obtain the desired surface weld conditions. In order to obtain proper heat balance the unit volume of the ribbon or member 14 encompassed immediately under and between the electrodes should be equal to or less than the corresponding region of the terminal. Usually the terminal effective volume (thermal mass) is two to three times the unit volume of the ribbon under the electrodes.

As pointed out above, indium-gold coated members may be surface welded to printed circuit boards as long as proper heat balance is maintained. While, in some applications, the members may be surface welded directly to the copper pad, to insure the prevention of blistering of the board during formation of the surface weld to the nickel plating, a thin layer, for example three mils, of nickel or other suitable material is first plated on the copper connection pad.

While various material thickness may be used, the FIGS. 4 and 6 examples were obtained using a nickel ribbon of 12 mil thickness and 30 mil width and have been found particularly satisfactory from electrical, strength and weldability standpoints.

The coating or plating 15 should be sufficiently thick to provide alloy material for the interface bond 22, but should not be so thick as to extrude from the edges of the weld so as to create short circuit hazards. A plating of a thickness of from 200 to 300 microinches has been found satisfactory.

In Rockwell hardness tests the interface bond 22 measured on the B scale was 100 while such hardness for the base ribbon material was 80.

As pointed out above, parameters of electrode pressure, electrode spacing, and electrode configuration are important considerations in achieving a good weld. Although some variation is permissible in the respective parameters, a pressure of 10 pounds per electrode, a spacing of 0.035 inch and a rectangular configuration of 0.030 inch by 0.060 inch for the electrodes have yielded excellent results.

It is thus seen that the method of this invention is particularly well suited to electronic interconnection applications due to the capability of the surface weld to be separated and rewelded. Tests have been conducted and have shown that a contact may be welded, separated, and rewelded more than thirty times without damage to the terminals or serious loss in weld strength.

This invention therefore provides a method for joinder of metal members, having a gold-indium coating on at least one of the members being joined, which gives superior utility and a significant advance in the art. As a result, there is provided in the aggregate an interconnection method particularly suitable for installations where reliability, repairability, broad frequency accommodation, size and weight are important considerations. Further, the surface welded members offer a superior, low noise, corrosion-impervious electrical connection at relatively low cost. Even though resistance or parallel-gap welding methods are illustrated, other welding methods such as pincer (cross) or opposed electrode, as well as photon techniques which include laser, infrared and X-ray may be employed which provide the proper heat-pressure-time relationships. Also welding techniques using an electron beam with the pressure being applied by a magnetic force, for example, may be utilized.

In addition to the uses of the invention specified above, the peelable feature of the material gives many applications in the mechanical field such as, for example, a means of opening containers or providing a repairable container opening, applying skin material to aircraft structure, or any application wherein serviceability is desired.

Although particular embodiments and examples have been illustrated and described for purposes of explanation, and since modifications and changes will become apparent to those skilled in the art, it is intended to cover in the appended claims all such modifications and changes

What we claim is:

1. The process for joining one metallic ribbon or sheet member with another metallic member comprising the steps of: coating a surface of at least one of the members from a solution consisting essentially of by weight of from about 41 to about 51 percent indium and from about 49 to about 59 percent gold relative one to the other, each of the members being selected from the group consisting of nickel, copper, silver, chromium, and nickel-iron alloys having atomic radii compatible with welding techniques; placing the at least one coated surface closely adjacent a surface of the other of the members; and interconnecting the members by surface welding of the same where the heat from the welding operation causes the coating and the material of the members to diffuse, fuse and coact forming a repairable interface bond.

2. The process defined in claim 1, wherein the at least one coated member is composed essentially of nickel.

3. The process for joining one metallic member with another metallic member, the members being selected from the group consisting of nickel, copper, silver, chromium, and nickel-iron alloys having atomic radii compatible with welding techniques, comprising the steps of: plating the surface of at least one of the members from a solution containing in relative percentages by weight of from about 41 to about 51 percent indium and from about 49 to about 59 percent gold; placing the at least one plated surface closely adjacent a surface of the other of the members; and imparting pressure while applying heat by surface welding to cause the plating and the material of the members to diffuse, fuse and coact creating a repairable interface bond therebetween.

4. The process defined in claim 3, wherein at least one of the members consists essentially of nickel.

5. The process of joining a metallic ribbon with another metallic member comprising the steps of: coating a surface of the ribbon from a solution consisting essentially of by weight of from about 41 to about 51 percent indium and from about 49 to about 59 percent gold relative one to the other, the ribbon and member each being selected from the group consisting of nickel, copper, silver, chromium, and nickel-iron alloys having atomic radii compatible with welding techniques; placing the coated surface of the ribbon adjacent the other member; positioning welding electrodes on the surface of the ribbon opposite the coated surface; and applying heat and pressure to the ribbon and other member through the welding electrodes thereby effecting diffusion, fusion and coaction of the coating material with the material of the ribbon and member to form a repairable interface bond therebetween.

6. The process defined in claim 5, wherein the ribbon consists essentially of nickel.

7. The process defined in claim 5, wherein each of the ribbon and other member contain nickel.

8. The process for joining metallic members with a repairable interface ternary alloy bond including gold and indium which is mutually diffused, fused and coacted with the material of the metallic members comprising the steps of: plating a surface of at least one of the members from a solution comprised by weight of from about 41 to about 51 percent indium and from about 49 to about 59 percent gold relative one to the other, the plated members being selected from the group consisting of nickel, copper, silver, chromium, and nickel-iron alloys having atomic radii compatible with welding techniques; placing the at least one plated surface closely adjacent a surface of the other of the members; locating welding electrodes on the surface of the at least one plated member opposite the plated surface thereof and over the area to be joined; and applying heat and pressure to the members through the welding electrodes thereby effecting mutual diffusion, fusion and coaction of the plated material with the material of the members producing a repairable interface bond therebetween consisting of a ternary alloy which allows the members to be separated by roll peeling movement of one of the members without damage and serious distortion to either member whereby the members can be rejoined by applying welding heat and pressure.

9. The process defined in claim 8, wherein the plated member consists essentially of nickel.

10. The process defined in claim 8, wherein at least one of the members contains nickel.

11. The process for repairably joining a metallic ribbon with another metallic member, the ribbon and member being selected from the group consisting of nickel, copper, silver, chromium, and nickel-iron alloys having atomic radii compatible with welding techniques, comprising the steps of: applying a coating on one surface of at least the ribbon from a solution consisting essentially in relative percentages by weight of from about 41 to about 51 percent indium and from about 49 to about 59 percent gold; positioning the coated surface of the ribbon closely adjacent the other member and at the point to be joined; locating welding electrodes on a surface of the ribbon opposite the coated surface and over the area to be joined; applying heat and pressure to the ribbon and member through the welding electrodes thereby effecting mutual diffusion, fusion and coaction of the coating material with the material of the ribbon and member producing an interface bond therebetween consisting of a ternary alloy; separating the ribbon from the member by a roll peeling movement of the ribbon without damage to the ribbon and member and without serious distortion of the ribbon; repositioning the coated surface of the ribbon closely adjacent the other member and at the point to be joined; relocating welding electrodes on the surface of the ribbon opposite the coating surface; reapplying heat and pressure to the ribbon and member through the welding electrodes thereby effecting mutual diffusion, fusion and coaction of the coating material with the material of the ribbon and member producing an interface bond therebetween of a ternary alloy of substantially the same strength characteristics as the initial interface bond.

12. The process defined in claim 11, wherein the ribbon consists essentially of nickel.

13. The process defined in claim 11, wherein at least one of the ribbon and member contains nickel.

14. The process defined in claim 11, wherein each of the ribbon and member consists essentially of nickel.

15. The process for joining nickel members with a repairable interface bond containing indium and gold which is mutually diffused, fused and coacted with the nickel of the members comprising the steps of: plating a surface of at least one of the nickel members with indium and gold from a solution consisting essentially by weight of from about 41 to about 51 percent indium and from about 48 to about 59 percent gold relative to one another; placing the at least one plated surface closely adjacent a surface of the other of the members; locating welding electrodes on the surface of the at least one plated member opposite the plated surface thereof and across the area to be joined; and applying heat and pressure to the members through the welding electrodes thereby effecting mutual diffusion, fusion and coaction of the plated material with the nickel of the members producing a repairable interface bond therebetween consisting essentially of a ternary alloy of nickel, gold and indium which allows the members to be separated by a peeling movement of one of the members without damage and serious distortion to either member, whereby the members can be rejoined by applying welding heat and pressure.

16. The process for joining metallic members of different materials, selected from the group consisting of nickel, copper, silver, chromium, and nickel-iron alloys having atomic radii compatible with welding techniques, with a repairable interface bond comprising the steps of: coating a surface of at least one of the metallic members with indium and gold from a solution consisting essentially by weight of from about 41 to about 51 percent indium and from about 49 to about 59 percent gold relative to one another; placing the at least one coated surface closely adjacent a surface of the other of the metallic members; locating welding electrodes on the surface of the at least one coated member opposite the coated surface thereof and across the area to be joined; and applying heat and pressure to the members through the welding electrodes thereby effecting mutual diffusion, fusion and coaction of the coated material with the material of the members producing a repairable interface bond therebetween consisting essentially of a quaternary alloy which allows the members to be separated by a peeling movement of one of the members without damage and serious distortion to either member, whereby the members can be rejoined by applying welding heat and pressure.

17. The process defined in claim 16, wherein one of the members consists essentially of nickel and the other member consists essentially of copper.

18. The process for joining metallic members with a repairable interface bond, the members being selected from the group consisting of nickel, copper, silver, chromium, and nickel-iron alloys having compatible atomic radii, comprising the steps of: coating a surface of at least one of the members with indium and gold from a solution consisting essentially by weight of from about 41 to about 51 percent indium and from about 49 to about 59 percent gold relative to one another; placing the at least one coated surface closely adjacent a surface of the other of the members; and applying heat and pressure to the members thereby effecting mutual diffusion, fusion and coaction of the coated material with the material of the members and producing a repairable interface bond therebetween, the heat applied being in the range between about 800° C. and about 1250° C.; the interface bond allowing the members to be separated by a peeling movement of one of the members without damage and serious distortion to either member, whereby the members can be rejoined by applying heat and pressure in the same range.

19. The process defined in claim 18, wherein the heat and pressure is applied to the metallic members from the surface of the at least one coated member opposite the coated surface thereof.

References Cited

UNITED STATES PATENTS

| | | | |
|---|---|---|---|
| 2,952,906 | 9/1960 | Singleton | 29—475 |
| 2,438,967 | 4/1948 | Ellsworth | 75—165 X |
| 2,464,821 | 3/1949 | Ludwick | 29—492 |
| 2,623,273 | 12/1952 | Murray | 29—504 X |
| 2,746,140 | 5/1956 | Belser | 29—504 X |
| 3,131,460 | 5/1964 | Allen | 29—504 X |
| 3,141,238 | 7/1964 | Harman | 29—501 X |
| 3,309,494 | 3/1967 | Hebert | 219—85 |
| 3,320,401 | 5/1967 | Zachry | 228—44 X |

FOREIGN PATENTS 622,071    4/1949    Great Britain.

OTHER REFERENCES

Constitution of Binary Alloys, Hansen, 1958, McGraw-Hill Book Company, page 211.

JOHN F. CAMPBELL, *Primary Examiner.*

CHARLIE T. MOON, *Examiner.*

R. F. DROPKIN, *Assistant Examiner.*